US008666668B2

(12) United States Patent
Sun et al.

(10) Patent No.: US 8,666,668 B2
(45) Date of Patent: Mar. 4, 2014

(54) MULTIPLE ANISOTROPIC PARAMETER INVERSION FOR A TTI EARTH MODEL USING WELL DATA

(75) Inventors: Yonghe Sun, Cypress, TX (US); Yue Wang, Danville, CA (US); Tong Xu, Sichuan (CN); Leonard Lin Zhang, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 275 days.

(21) Appl. No.: 13/368,134

(22) Filed: Feb. 7, 2012

(65) Prior Publication Data

US 2012/0185171 A1    Jul. 19, 2012

Related U.S. Application Data

(62) Division of application No. 12/327,671, filed on Dec. 3, 2008.

(51) Int. Cl.
*G01V 1/00* (2006.01)

(52) U.S. Cl.
USPC .......................................................... 702/18

(58) Field of Classification Search
USPC .......................................................... 702/18
See application file for complete search history.

(56) References Cited

U.S. PATENT DOCUMENTS

2012/0253762 A1*  10/2012  Ergas et al. ........................ 703/6

OTHER PUBLICATIONS

Thomsen, Weak Elastic Anistropy, Geophysics, Oct. 1986, 1954-1966.

Alkhalifah,et.al., Velocity Analysis for Transversely Isotropic Media, Geophysics, vol. 60, No. 5, Sep.-Oct. 1995, P. 1550-1566.
Cerveny, "Seismic rays and ray intensities in inhomogeneous anisotropic media," Geophysical Journal, vol. 29, pp. 1-13 (1972).
Gajewski et al. "Vertical seismic profile synthetics by dynamic ray tracing in laterally varying layered anisotropic structures" Journal of Geophysical Research, vol. 95., No. B7, pp. 11,301-311,315, Jul. 10, 1990.
Zhou, et. al. Seg int'l Exposition and $74^{th}$ Annual Meeting "Tomographic velocity analysis in strongly anisotropic TTI media", Oct. 2004.
Bear et al 2005: "Integrated velocity model estimation for improved positioning with anisotropic PSDM ".
Elapavuluri, "Estimation of Thomsen's anisotropic parameters from geophysical measurements using equivalent offset gathers and the shifted-hyperbola NMO equation" Calgary, Alberta, Apr. 2003.
Rajput et al., "Signal preserving seismic interference noise attenuation on 3D marine seismic data"Compagnie Générale de Geophysique (CGG).
Grechka et al., "Multicomponent stacking-velocity tomography by transversely isotropic media" Geophysics, vol. 67, No. 5, Sep.-Oct. 2002, p. 1564-1574.
Zhou, et. al. ,Seg "3-D Tomographic velocity analysis in transversely isotropic media", 2003.

* cited by examiner

*Primary Examiner* — Aditya Bhat
(74) *Attorney, Agent, or Firm* — Marie L. Clapp

(57) ABSTRACT

A method for determining values of anisotropic model parameters of a Tilted Transversely Isotropic (TTI) Earth model, the method including obtaining an initial TTI earth model that substantially flattens common-imaging-point gathers and substantially ties seismic data to well data; inputting checkshot data and/or VSP data to determine updated values of $Vp_0$ near the well locations; determining an incremental improvement $\Delta\delta$; extrapolating the relative change $\Delta\delta$ from near-well locations to the entire three dimensional TTI earth model; determining updated values of $Vp_0=Vp_0(1-\Delta\delta)$; inputting near-to-mid-offset/angle and mid-to-far-offset/angle residual moveout information; and providing updated values of $\delta$ and $\eta$.

2 Claims, 3 Drawing Sheets

| | |
|---|---|
| scenario 1 | update δ only |
| scenario 2 | update δ and Vpo simultaneously |
| scenario 3 | update δ and η simultaneously |
| scenario 4 | update Vpo only |
| scenario 5 | update Vpo and η simultaneously |
| scenario 6 | update η only |
| scenario 7 | update δ, Vpo and η simultaneously |

MULTIPLE ANISOTROPIC PARAMETER INVERSION FOR A TTI EARTH MODEL USING WELL DATA

CROSS-REFERENCE TO RELATED APPLICATIONS

This application is a divisional application of U.S. patent application Ser. No. 12/327,671 entitled "MULTIPLE ANISOTROPIC PARAMETER INVERSION FOR A TTI EARTH MODEL" filed Dec. 3, 2008.

TECHNICAL FIELD

The present invention relates to a method for determining values of anisotropic model parameters of a Tilted Transversely Isotropic (TTI) earth model.

BACKGROUND

In order to analyze a geological structure of a subterranean formation, exploration geophysicists make many assumptions. One of them is that the subterranean formation is isotropic while in fact it is fundamentally anisotropic. This faulty assumption may result in erroneous imaging and interpretation of the geological structure. To extend the seismic processing techniques to anisotropic media, it is desirable to obtain a measure of the anisotropy of the geological structure.

Seismic anisotropy can be defined as the dependence of seismic velocity on the direction of wave propagation. It is known that a transverse isotropy with tilted axis earth model or TTI earth model can be used to model the propagation of waves and obtain an image of the subterranean formation in anisotropic media. The physical parameters to describe a TTI earth model include (1) the symmetry axis, (2) P-wave (compressional) velocity along symmetry axis—$Vp_0$, (3) a parameter that specifies how the velocities vary for small angles from the symmetry axis—$\delta$, and (4) a parameter that determines the velocity at large angles from the axis of symmetry—$\eta$ (See Thomsen, "Weak Elastic Anisotropy", Geophysics. vol. 51, no. 10, October 1986 and Alkhalifah and Tsvankin, "Velocity analysis for transversely isotropic Media", Geophysics, vol. 60, 1550-1566, 1995).

Some TTI earth models also use anisotropic parameter $\epsilon$ to describe the propagation of waves in an anisotropic medium. Parameter $\epsilon$ satisfies the following relationship $\eta=(\epsilon-\delta)/(1+2\delta)$. S (shear) wave velocity is required to completely describe a TTI earth model, but in P-wave processing, S-wave velocity is usually obtained using an empirical relationship with P-wave velocity.

Usually a TTI earth model is a three directional model. Each point in the model is described by its coordinates and the values of anisotropic parameters. In certain situations, only a few quantities of anisotropic parameters may be needed to fully define a model if the properties of the anisotropic medium do not change from point to point. However, in most situations, the TTI earth model requires a large number of spatially varying values of anisotropic parameters to accurately define the model.

The anisotropic parameters of a TTI earth model may be directly measured from core data. However, drilling a well and coring are very expensive processes and direct measurements are only possible at very few well locations. For 3D imaging, it is desirable to determine the anisotropic parameters of the TTI earth model using also laterally extended data.

SUMMARY

In an aspect of the invention, there is provided a computer implemented method for determining values of anisotropic model parameters of a Tilted Transversely Isotropic (TTI) Earth model, the anisotropic parameters including P-wave velocity ($Vp_0$) along a tilted symmetry axis, the Thomsen anisotropy parameters $\delta$ and $\epsilon$ (or $\eta=(\epsilon-\delta)/(1+2\delta)$) representative of variations of wave velocities as a function of wave propagation angle from the symmetry axis, the method including: acquiring input data for a geological volume of interest; determining a theoretical relationship between the input data and the anisotropic model parameters; and calculating the values of the anisotropic model parameters at each of a plurality of subsurface locations in the geological volume of interest based on the theoretical relationships and the input data using workflows involving iterative or sequential combinations of processes including input data preprocessing, conventional tomographic inversion, three dimensional tomographic inversion based on a tilted transversely isotropic model, and three dimensional pre-stack depth migration using a tilted transversely isotropic model.

In another aspect of the invention, there is provided a computer product having machine executable instructions, the instructions being executable by a machine to perform a tomographic inversion method for determining values of anisotropic parameters of a TTI earth model, the anisotropic parameters including P-wave velocity ($Vp_0$) along a tilted symmetry axis, the Thomsen anisotropy parameters $\delta$ and $\epsilon$ (or $\eta=(\epsilon-\delta)/(1+2\delta)$ representative of a variation of wave velocities as a function of wave propagation angle from the symmetry axis, the method including determining a relationship between input data and the anisotropic parameters, the input data being acquired for a geological volume of interest; and calculating the values of the anisotropic parameters at each of a plurality of subsurface locations in the geological volume of interest based on the relationship and the input data using workflows involving iterative or sequential combinations of processes including input data preprocessing, three dimensional tomographic inversion, and three dimensional TTI pre-stack depth migration.

A computer implemented method for determining values of anisotropic parameters of a three dimensional TTI earth model, the anisotropic parameters including P-wave velocity ($Vp_0$) along a tilted symmetry axis, the Thomsen anisotropy parameters $\delta$, $\epsilon$ (or $\eta=(\epsilon-\delta)/(1+2\delta)$) representative of variation of wave velocities as a function of wave propagation angle from the symmetry axis, the method including (a) obtaining an initial migration velocity model that substantially flattens common-imaging-point gathers and substantially ties seismic data to well data, the initial migration velocity model including initial values $Vp_0$, $\delta$, $\epsilon$ (or $\eta$) at each of a plurality of subsurface locations in a geological volume of interest; (b) inputting checkshot data, or VSP data, or both checkshot and VSP data at well locations into a three dimensional tomographic inversion to determine updated values of $Vp_0$ near the well locations, the values of $Vp_0$ being updated by a correction $\Delta Vp_0$, wherein $Vp_0=Vp_0+\Delta Vp_0$; (c) determining an incremental improvement $\Delta\delta$ to $\delta$(initial) using the relative change $\Delta\delta=(\Delta Vp_0)/Vp_0$; (d) extrapolating the relative change $\Delta\delta$ from near-well locations to the entire three dimensional TTI earth model at each of the plurality of subsurface locations, taking into account geological consistency and regularization, to determine updated values of $\delta$, wherein $\delta=\delta+\Delta\delta$; (e) determining updated values of $Vp_0=Vp_0(1-\Delta\delta)$ using the extrapolated three dimensional $\Delta\delta$ at each of the plurality of subsurface locations and obtaining the three dimensional extended incremental update $\Delta Vp_0 = -\Delta \delta Vp_0$; (f) inputting near-to-mid-offset/angle residual moveout information in the common-imaging-point gathers obtained with an improved migration velocity model that is defined with the updated values of $Vp_0$ and $\delta$ into a TTI tomographic inversion process to further provide updated values of $\delta$ at each of the plurality of subsurface locations; and (g) inputting near-to-far-offset/angle residual moveout information in the common-imaging-point gathers obtained with the improved model the TTI tomographic inversion process to provide updated values of $\eta$ at each of the plurality of subsurface locations.

These and other objects, features, and characteristics of the present invention, as well as the methods of operation and functions of the related elements of the structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 shows various scenarios that can be used in the workflow of FIG. 2, in accordance with an embodiment of the invention.

DETAILED DESCRIPTION

Embodiments of the invention provide a method for accurately determining values of anisotropic parameters of a Titled Transversely Isotropic (TTI) earth model at each of a plurality of locations in a geological volume of interest. In an embodiment, the estimated anisotropic parameters are calibrated with direct measurements at well locations. Embodiments of the invention also relate to a computer product having machine executable instructions, the instructions being executable by a machine to perform a method for determining values of anisotropic parameters of a TTI earth model.

In an embodiment, the method for accurately determining values of anisotropic parameters of a TTI earth model include three main aspects which are (1) the use of input data to determine the anisotropic parameters, (2) the relationship between the input data and the anisotropic parameters, and (3) the process employed to convert the input data to values of the anisotropic parameters. The process that is used to convert input data to anisotropic parameters may be referred to as an inversion process.

Figure 1:
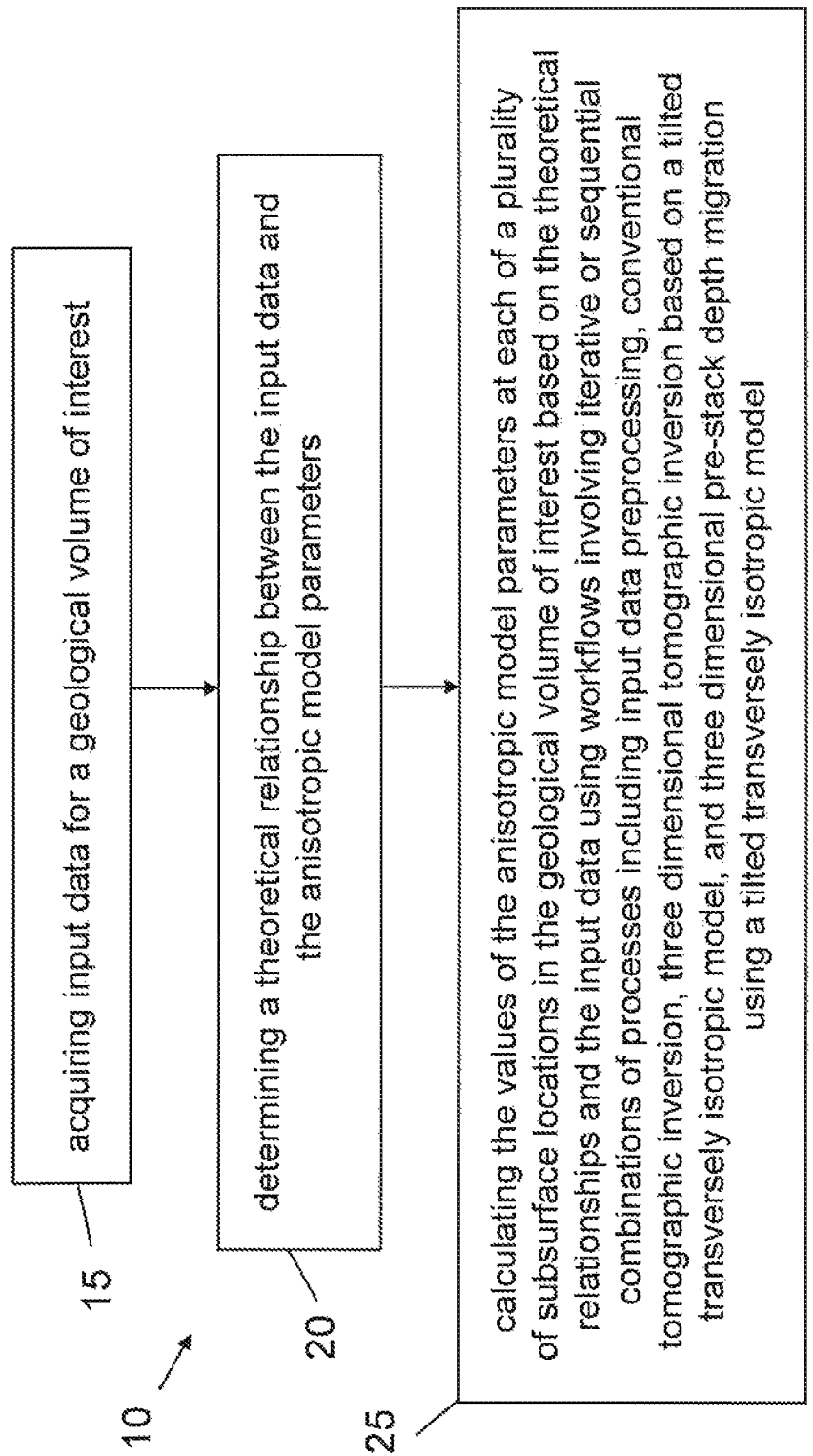
FIG. 1 shows a method for determining values of anisotropic model parameters of a Tilted Transversely Isotropic (TTI) Earth model in accordance with an embodiment of the invention.

Referring now to FIG. 1, this figure shows a method 10 for determining values of anisotropic parameters of a TTI earth model in accordance with an embodiment of the invention. With the method of FIG. 1, the values of the anisotropic parameters ($Vp_0$, $\delta$, $\eta$ and/or $\epsilon$) are determined for each coordinate (x, y, z) in the geological volume of interest covered by the TTI earth model. The method starts at procedure 15 where input data are acquired for a geological volume of interest. Input data may include, for example, surface seismic data, vertical seismic profile data, VSP (vertical seismic profile) data, check shot data, well log data, interpretational data, regional trend, a priori data, or any combination of the foregoing. The interpretational data includes picks of horizon and shape.

Surface seismic data, which record reflections from the earth, have great coverage and are readily available in most areas. The wave reflected at different angles is sensitive to anisotropic parameters. Therefore, surface seismic data can be used as input data for the anisotropic parameter estimation. The measurable data include travel-times at different offsets and depth error of migrated gathers at different offsets/angles. VSP and check shot data, which record the direct arrival of waves from different directions, are also sensitive to anisotropic parameters. The measurement is travel-time at different borehole locations. As known in the art, VSP data are acquired by positioning the wave receiver down the borehole and the wave emitter near the surface. Check shot data are acquired by positioning both the wave emitter and receiver down the borehole.

After acquiring input data, the method 10 proceeds to procedure 20 where a theoretical relationship is determined between the input data and the anisotropic parameters. The ray theory can be used to derive the theoretical relationship between the recorded travel-time (input data) and anisotropic parameters of the TTI earth model. Specifically, the theoretical relationship between the input data and the anisotropic parameters can be obtained by first implementing the TTI specification techniques described in Thomsen, "*Weak elastic anisotropy,*" Geophysics, vol. 51, pgs. 1954-66 (1986); and/or Alkahalifah, et al., "*Velocity analysis for transversely isotropic media,*" Geophysics, vol. 60, pgs. 1550-1566 (1995) to specify anisotropic Earth model velocities. The anisotropic ray tracing is then performed by one or more techniques described in Cerveny, "*Seismic rays and ray intensities in inhomogeneous anisotropic media,*" Geophysical Journal, vol. 29, pgs. 1-13 (1972) and/or Gajewski et al., "*Vertical seismic profile synthetics by dynamic ray tracing in laterally varying layered anisotropic structures,*" Journal of Geophysics Res., vol. 95, pgs. 11301-11315, (1990). Additional information regarding the use of ray theory to derive the theoretical relationship between the input data and the anisotropic parameters can be gleaned from U.S. patent application Ser. No. 12/079,170, System and Method for Migrating Seismic Data, filed on Mar. 24, 2008.

After determining the theoretical relationship between the input data and the anisotropic parameters, the method proceeds to procedure 25 where the values of the anisotropic model parameters at each of a plurality of subsurface locations in the geological volume of interest are calculated based on the theoretical relationships and the input data. In an embodiment, the calculation of the anisotropic parameters uses workflows involving iterative or sequential combinations of processes including input data preprocessing, conventional tomographic inversion or three dimensional tomographic inversion based on a tilted transversely isotropic model, and three dimensional pre-stack depth migration using a tilted transversely isotropic model. Further, the iterative or sequential combinations of processes may include interpretive picking.

The estimation of the anisotropic parameters of procedure 25 is a computational process which uses the recorded data and a theoretical relationship to solve the model parameters.

This process is called tomographic inversion. The inversion can be performed differently using various workflows. For example, the anisotropic parameters may be estimated sequentially (i.e. one at a time) or, preferably, various parameters may be estimated simultaneously. It is also possible to use one type of data to estimate one or multiple parameters. In another embodiment, all available input data are used to estimate all anisotropic parameters simultaneously. Further, the values of the anisotropic model parameters can be determined using various combinations of inversions with full sets or subsets of the input data and full sets or subsets of the output data.

The tomographic inversion of procedure 25 is recursive and iterative, and may use three dimensional tilted transversely isotropic ray tracing to model three dimensional wave propagation. Input data preprocessing may include normalizing the input before performing the three dimensional TTI tomographic inversion. Input data preprocessing may also include, prior to performing the three dimensional TTI tomographic inversion, migrating the seismic data using 3D TTI prestack depth migration algorithms, sorting the migrated seismic data according to their subsurface location and their migration offset/angle into common-image-point (CIP) gathers, and selecting and quantifying residual moveouts in the common-image-point gathers domain. TTI prestack depth migration algorithms are known in the art.

The values of the anisotropic parameters are calculated by iteratively selecting values of $Vp_0$, $\delta$ and $\eta$. Specifically, the values of the anisotropic parameters are calculated until (a) seismic image positions of subsurface structures in the geological volume of interest tie their spatial positions recognized in drilled wells and (b) residual moveouts in common-imaging-point gathers are minimum at every point in the model. The subsurface structures include rock boundaries.

Figure 2:
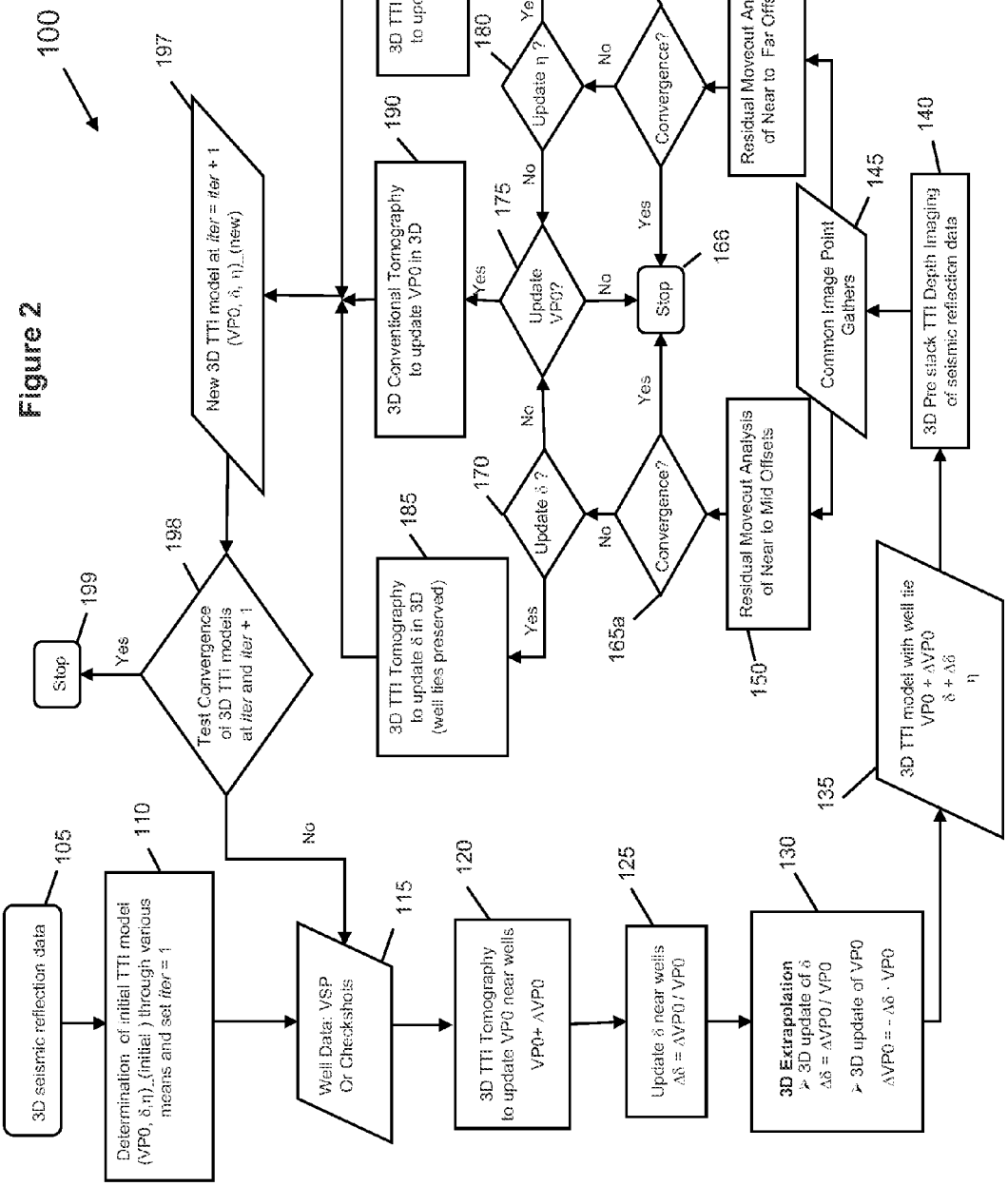
FIG. 2 shows a workflow for determining values of anisotropic parameters in accordance with an embodiment of the invention.

Referring now to FIG. 2, this figure shows a workflow 100 for determining values of anisotropic parameters of a Tilted Transversely Isotropic (TTI) earth model in accordance with an embodiment of the invention. The iterative workflow can begin at procedure 105 where three dimensional seismic reflection data are measured. The workflow then proceeds to procedure 110 where the seismic reflection data are used to determine an initial TTI earth model for the geological volume of interest. The initial TTI earth model may be determined using various means. For example, the initial TTI earth model can be determined from velocity information and various processing performed on measured data as well as knowledge, either regionally or globally, about the area in which the geological volume of interest is located. Furthermore, the initial TTI model building also includes estimating subsurface reflector structural dips and obtaining TTI symmetry axes in the geological volume of interest. In the initial TTI earth model, a value of each parameter $Vp_0$, $\delta$ and $\eta$ is provided at each of a plurality of locations (x, y, z) in the geological volume of interest.

After determining an initial TTI earth model, the workflow proceeds to block 115 and procedure 120 where well data (block 115) are used to perform a three dimensional (3D) TTI tomography (procedure 120) based on ray tracing to update the value of $Vp_0$ of the TTI earth model near the well(s). Well data may include VSP data or checkshot data, which represent information about wave velocities in the well(s). The updated values of $Vp_0$ in the geological volume of interest near the well(s) corresponds to $Vp_0(\text{initial}) + \Delta Vp_0$. With this operation, the values of $Vp_0$ near the well(s) are updated in the initial TTI earth model. Specifically, the VSP data and checkshot data are used in the embodiment of FIG. 2 to tie the seismic data to the well data.

After updating the values of $Vp_0$ near the well(s), the workflow 100 proceeds to procedure 125 where the initial values of $\delta$ near the well(s) are updated using the updated values of $Vp_0$ according to the following transformation $\Delta\delta = \Delta Vp_0 / Vp_0$ with $\delta(\text{updated}) = \delta(\text{initial}) + \Delta\delta$. The transformations of procedures 110-125 enable one to refine the initial 3D TTI earth model by providing a more accurate TTI model near the well(s).

Once the initial TTI earth model has been updated near the well(s) with the updated values of $Vp_0$ and $\delta$, the workflow 100 proceeds to procedure 130 where the remaining points in the model, i.e. the points outside the location(s) near the well(s), are populated. In the embodiment of FIG. 2, the remaining points in the model are populated using a three dimensional extrapolation process and the updated values of $Vp_0$ and $\delta$ near the well(s). The three dimensional extrapolation process is performed by first extrapolating $\delta$ or $\Delta\delta$ in the remaining locations of the model and then obtaining a three dimensional update of $Vp_0$ using the transformation $\Delta Vp_0 = -\Delta\delta * Vp_0$. It will be appreciated that various types of algorithms can be used to extrapolate the values of $\delta$ or $\Delta\delta$ outside the well locations and to obtain extended updates of $Vp_0$ and $\delta$. The result of the extrapolation process (see block 135) provides a three dimensional TTI earth model with well tie having updated values of $Vp_0$ and $\delta$ at each point of the model. The three dimensional TTI earth model of block 135 includes the following parameters at each point (x, y, z) of the model: $Vp_0(\text{initial}) + \Delta Vp_0$, $\delta(\text{initial}) + \Delta\delta$ and $\eta(\text{initial})$.

The model determined at block 135 is used to perform a three dimensional (3D) pre-stack TTI depth imaging of seismic reflection data at procedure 140. With this procedure, seismic reflection data that have been recorded for the geological volume of interest are processed/migrated by the model to provide a new image of the sub-surface of the geological volume of interest. As will be appreciated, the migration of seismic data will typically enable an image to be formed of the geological volume of interest from the migrated seismic data that is a more accurate depiction of the geological features present in the seismic volume of interest than an image formed from migrated data with an isotropic algorithm. The three dimensional pre-stack TTI depth imaging of seismic reflection data of procedure 140 provides common image point gathers (block 145). As known in the art, common image point gathers correspond to the migrated seismic data that end up at a same image position in the geological volume of interest.

Once the common image point gathers have been identified by the 3D pre-stack TTI depth imaging analysis, the workflow 100 then proceeds to procedures 150 and/or 155 wherein a residual moveout analysis is performed. As known in the art, residual moveout analysis is a basic step in velocity model refinement. The analysis is generally carried out using semblances for a grid of inline and xline locations. One semblance panel is computed for each common-image-point gather as a function of depth and offset. The residual moveout analysis on the common image point gathers is carried out for the near to mid offsets at procedure 150 while the residual moveout analysis on the common image point gathers is carried out for the near to far mid offsets at procedure 155. Near and far offsets correspond, respectively, to a small and a large distance between the source and the receiver.

It will be appreciated that the procedures 150, 155 of FIG. 2 are intended to cover multiple moveout analyses. That is, the residual moveout analysis of FIG. 2 can be performed only for the near to mid offsets (procedure 150) or only for the near to far offsets (procedure 155) in embodiments of the invention. Alternatively, in an embodiment of the invention, and as shown in FIG. 2, the residual moveout analysis can be performed for both the near to mid offsets and the near to far offsets simultaneously.

The residual moveout analysis provides updated wave velocities $Vp_0$ for each point of the 3D TTI model defined at procedure 135. After determining the updated velocities $Vp_0$ for each point of the model, a determination is made at blocks 165a and/or 165b as to whether convergence is obtained, i.e. whether the results of the residual moveout analyses of procedures 150 and/or procedure 155 is/are within a predetermined tolerance. If convergence is obtained, the workflow 100 ends at block 166.

If convergence is not obtained, the workflow 100 proceeds to block 170 and/or block 180 wherein it is determined whether the values of $\delta$ and/or $\eta$ should be updated for each point of the model. If the result of the inquiry is positive at block 170, the workflow proceeds to procedure 185 where a three dimensional (3D) TTI tomography is performed to update the value of $\delta$ for each point of the model using the results of the residual moveout analysis for the near to mid offsets. It is greatly beneficial to update the values of $\delta$ only because such an update does not modify the values of wave velocities $Vp_0$ in the model. As a result, the tie between well and seismic data that was previously obtained with the model constructed at block 135 is not qualitatively destroyed in a low dip setting. In that way, it is possible to obtain a faster and more robust conversion for the values of the TTI model.

Alternatively or additionally, it is determined whether the values of $\eta$ should be updated for each point of the model. If the result of the inquiry is positive at block 180, the workflow proceeds to procedure 195 where a three dimensional (3D) TTI tomography is performed to update the value of $\eta$ for each point of the model using the results of the residual moveout analysis for the far to mid offsets.

If the values of $\delta$ and/or $\eta$ are not updated, it is determined whether the values of wave velocities $Vp_0$ should be updated (block 175). If the result of the inquiry is negative, the workflow ends at block 166. If the result of the inquiry is positive, the workflow proceeds to procedure 190 where a 3D TTI tomography is performed to update the values of velocities $Vp_0$ in the geological volume of interest.

The results of the 3D TTI tomography analyses of procedures 185, 190 and 195 provide a new three dimensional (3D) TTI model at block 197 with updated values of $\delta$, $Vp_0$ and $\eta$ at each point (x, y, z) of the model. It is then determined whether convergence is obtained for the updated values of $\delta$, $Vp_0$ and $\eta$ in the new model of block 197 (block 198). Various tests may be used to determine whether convergence is obtained. For example, it is determined whether the obtained values are below a predetermined threshold. If the result of the inquiry is positive, the workflow of FIG. 2 ends at procedure 199. If the result of the inquiry is negative, the workflow 100 proceeds back to block 115 where the well data are used to perform a three dimensional (3D) TTI tomography (procedure 120) based on ray tracing to update the value of $Vp_0$ of the TTI earth model obtained at block 197 near the well(s). Thus, the TTI earth model obtained at block 197 is used as a new initial model for the subsequent iteration. In an embodiment, this new initial TTI earth model is more refined than the initial model used at the first iteration in that it substantially flattens common-imaging-point gathers and substantially ties seismic data to well data. After determining a modified model with updated values of $Vp_0$ near the well(s), the workflow 100 proceeds to procedures 125-198 where updated values of $\delta$ and/or $Vp_0$ and/or $\eta$ are determined. The workflow is then iterated until convergence is obtained for the values of $\delta$ and/or $Vp_0$ and/or $\eta$ (i.e. the values of $\delta$ and/or $Vp_0$ and/or $\eta$ substantially do not change between two subsequent iterations).

It will be appreciated that the workflow of FIG. 2 is intended to encompass several scenarios for optimizing the three dimensional (3D) TTI model. Referring now to FIG. 3, this figure shows the various scenarios that can be applied at each iteration. In the first scenario, $\delta$ is the only parameter that is updated at each location in the model. The first scenario is preferred because the update of $\delta$ does not change the values of $Vp_0$ in a low dip setting and, as a result, the quantitative tie between the well data and the seismic data is not destroyed during the optimization of $\delta$. In the second scenario, parameters $\delta$ and $Vp_0$ are updated. In the third scenario, parameters $\delta$ and $\eta$ are updated. In the fourth scenario, the velocities $Vp_0$ are updated. In the fifth scenario, $Vp_0$ and $\eta$ are updated. In the sixth scenario, $\eta$ is updated and, in the seventh scenario, $\delta$, $\eta$ and $Vp_0$ are updated.

It will be appreciated that the one or more parameters updated at a given iteration may not be the same as the one or more parameters updated at a subsequent iteration. In other words, the anisotropic parameters ($\delta$, $\eta$ and $Vp_0$) optimized at each iteration may be different. Thus, in an embodiment, it is envisioned that various scenarios could be used to optimize the three dimensional TTI model. Further, it is envisioned that after optimizing a first parameter, e.g. $\delta$ according to the first scenario, the workflow of FIG. 2 may be pursued to optimize a second parameter, e.g. $\eta$, and then a third parameter, e.g. $Vp_0$. Therefore, the parameters $\delta$, $\eta$, and $Vp_0$ can be optimized simultaneously or sequentially. Further, it will be appreciated that the selection of the parameters updated at each iteration is highly dependent on the maturity of the overall model building process that includes both depth imaging and tomography and the type and the quality of well and seismic data that are used to construct the 3D TTI model.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims.

It will be appreciated that the different acts involved in determining values of anisotropic model parameters of a Tilted Transversely Isotropic (TTI) Earth model may be executed according to machine executable instructions or codes. These machine executable instructions may be embedded in a data storage medium. A processor may be configured to execute the instructions.

Software functionalities of a computer system involving programming, including executable codes, may be used to implement the above described model. The software code may be executable by a general-purpose computer. In operation, the code and possibly the associated data records may be stored within a general-purpose computer platform. At other times, however, the software may be stored at other locations and/or transported for loading into an appropriate general-purpose computer system. Hence, the embodiments discussed above involve one or more software or computer products in the form of one or more modules of code carried by at least one machine-readable medium. Execution of such codes by a processor of the computer system enables the platform to implement the functions in essentially the manner performed in the embodiments discussed and illustrated herein.

As used herein, terms such as computer or machine "readable medium" refer to any medium that participates in providing instructions to a processor for execution. A computer or a machine "readable medium" may be broadly termed a "computer product." Such a medium may take many forms, including but not limited to, non-volatile media, volatile media, and transmission media. Non-volatile media include, for example, optical or magnetic disks, such as any of the storage devices in any computer(s) operating as discussed above. Volatile media include dynamic memory, such as the main memory of a computer system. Physical transmission media include coaxial cables, copper wires and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read or send programming codes and/or data. Many of these forms of computer readable media may be involved in carrying one or more sequences of one or more instructions to a processor for execution.

It is to be understood that the present invention contemplates that, to the extent possible, one or more features of any embodiment can be combined with one or more features of any other embodiment.

What is claimed is:

1. A computer implemented method for determining values of anisotropic model parameters of a three dimensional TTI earth model, the anisotropic parameters including P-wave velocity ($Vp_0$) along a tilted symmetry axis, the Thomsen anisotropy parameters $\delta$, $\epsilon$ (or $\eta=(\epsilon-\delta)/(1+2\delta)$) representative of variation of wave velocities as a function of wave propagation angle from the symmetry axis, the method comprising:

a. obtaining an initial TTI earth model that substantially flattens common-imaging-point gathers and substantially ties seismic data to well data, the initial migration velocity model including initial values $Vp_0$, $\delta$, $\epsilon$ (or $\eta$) at each of a plurality of subsurface locations in a geological volume of interest;

b. inputting checkshot data, or VSP data, or both checkshot and VSP data at well locations into a three dimensional tomographic inversion to determine updated values of $Vp_0$ near the well locations, the values of $Vp_0$ being updated by a correction $\Delta Vp_0$, wherein $Vp_0=Vp_0+\Delta Vp_0$;

c. determining an incremental improvement $\Delta\delta$ to $\delta$(initial) using the relative change $\Delta\delta=(\Delta Vp_0)/Vp_0$;

d. extrapolating the relative change $\Delta\delta$ from near-well locations to the entire three dimensional TTI earth model at each of the plurality of subsurface locations, taking into account geological consistency and regularization, to determine updated values of $\delta$, wherein $\delta=\delta+\Delta\delta$;

e. determining updated values of $Vp_0=Vp_0 (1-\Delta\delta)$ using the extrapolated three dimensional $\Delta\delta$ at each of the plurality of subsurface locations and obtaining the three dimensional extended incremental update $\Delta Vp_0=-\Delta\delta\, Vp_0$;

f. inputting near-to-mid-offset/angle residual moveout information in the common-imaging-point gathers obtained with an improved migration velocity model that is defined with the updated values of $Vp_0$ and $\delta$ into a TTI tomographic inversion process to further provide updated values of $\delta$ at each of the plurality of subsurface locations; and g. inputting near-to-far-offset/angle residual moveout information in the common-imaging-point gathers obtained with the improved model the TTI tomographic inversion process to provide updated values of $\eta$ at each of the plurality of subsurface locations.

2. The method of claim 1, further comprising iteratively repeating (a), (b), (c), (d), (e), (f) and (g), wherein the improved parameters of the TTI model determined at the end of an iteration corresponds to the initial parameters of the TTI model at the next iteration.

* * * * *